United States Patent [19]

Stanley

[11] Patent Number: 4,958,411
[45] Date of Patent: Sep. 25, 1990

[54] DUAL TUBE STUFFING HORN WITH EXPANDING SPRING FOR SIZE CONTROL

[75] Inventor: Thomas R. Stanley, Kansas City, Mo.
[73] Assignee: Teepak, Inc., Westchester, Ill.
[21] Appl. No.: 448,793
[22] Filed: Dec. 11, 1989
[51] Int. Cl.⁵ .............................................. A22C 11/02
[52] U.S. Cl. .................................... 17/41; 17/49; 17/1 R
[58] Field of Search .............. 17/41, 42, 49, 33, 34, 17/35, 1 R

[56] References Cited

U.S. PATENT DOCUMENTS

| | | | |
|---|---|---|---|
| 3,971,101 | 7/1976 | Townsend et al. | 17/33 |
| 4,371,554 | 2/1983 | Becker | 17/49 |
| 4,512,059 | 4/1985 | Beckman | 17/1 R |
| 4,521,938 | 6/1985 | Kupcikevicius | 17/1 R |
| 4,535,508 | 8/1985 | Aceto | 17/49 |
| 4,593,434 | 6/1986 | Townsend | 17/41 |
| 4,727,624 | 3/1988 | Stanley | 17/49 |

Primary Examiner—Willis Little
Attorney, Agent, or Firm—Howard M. Ellis; Michael L. Dunn

[57] ABSTRACT

An apparatus and method of filling food casing for better size control includes an improved stuffing horn with a built-in presizing element in the form of a spirally wound spring for diametrically engaging the inside wall of unfilled casing on the filling horn stretching the casing to the recommended stuffed diameter prior to filling.

13 Claims, 2 Drawing Sheets

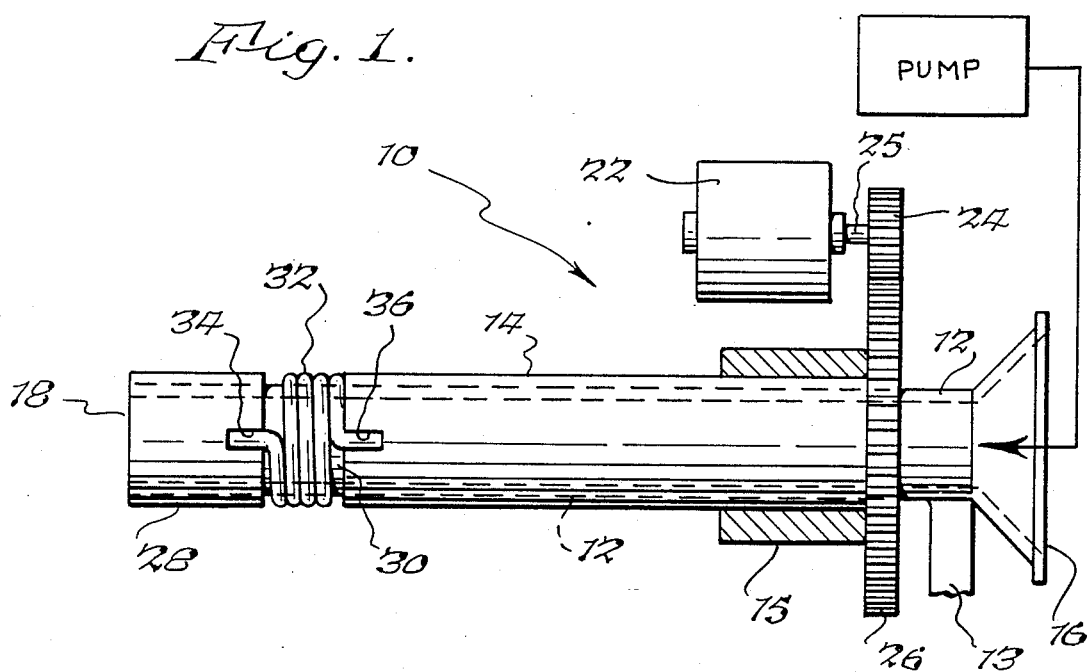
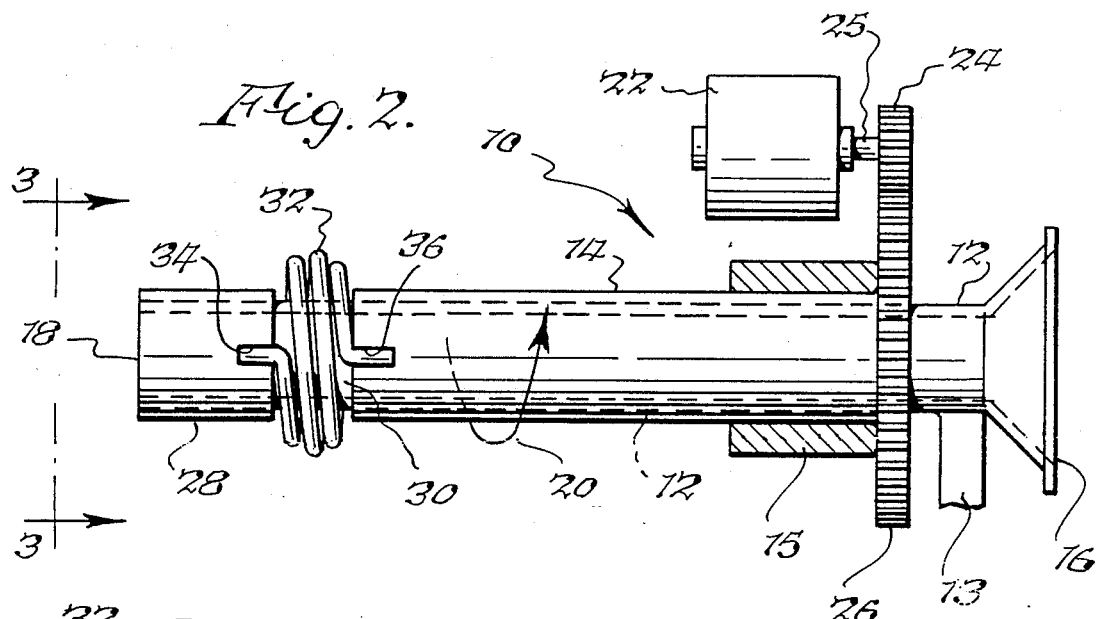
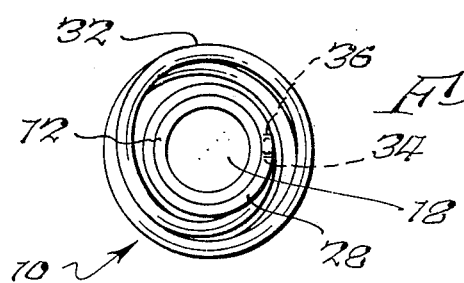

DUAL TUBE STUFFING HORN WITH EXPANDING SPRING FOR SIZE CONTROL

BACKGROUND OF THE INVENTION

The present invention relates generally to new and useful methods and devices for packaging food products, and more specifically, to improved stuffing horns with presizing devices for tubular food casings.

In the manufacture of sausage products, a tubular food casing, such as nonedible cellulose is loaded onto the stuffing horn of a filling machine and stuffed with an emulsion, usually comprised of comminuted meat together with fillers, seasoning, spices, etc. In the case of small sausage products, like frankfurters, the filled casings are twisted, tied or clipped into suitable links at predetermined intervals and further processed. For larger sausage products, like bolognas, salamis, and the like, the meat emulsion is introduced into larger, heavier walled fibrous type casings and formed into chubs or lengthy individual sausage sticks.

In preparing large diameter sausage products, like bologna, an important consideration is the maintenance of accurate size control over the entire length of the sausage stick. It is particularly important that the diameter of large sausage products be carefully controlled so that meat packers are able to cut the sausage into slices of predetermined thickness and diameter for prepackaging. The objective is to have a given number of slices weigh precisely a predetermined amount for each package.

In stuffing larger sausage products, however, there is some tendency for diameter variations to occur which may be due to varying stretch properties of casings and meat emulsion charging pressures. There may be less variation in product diameter with sausage stuffed in fibrous casings than nonreinforced type casings. Nevertheless, meat processors are constantly striving to improve operations which affect finished package yields. Constant control during stuffing of green stick diameter assures more uniform slice weight and minimizes package over and underweight variations.

To facilitate stuffing and also obtain greater dimensional uniformity in filling larger food casings, presizing devices have been used for diametrical stretching. This is achieved by longitudinally passing tubular casing prior to filling, in most instances over a stationary type sizing device which operates to stretch the casing to the stuffed diameter recommended by the manufacturer. In addition to the stretching action of the presizing device, casing moving over some devices generates friction. This creates drag or holdback forces on the casing increasing the diameter of the filled casing and vice versa depending on the extent of the forces being exerted.

To improve stuffing efficiency, U.S. Pat. No. 4,007,761 (Beckman) discloses a self-sustaining tubular casing article with a presizing ring prepackaged in the deshirred end of a shirred strand. The objective is to facilitate the filling process by engaging both a new shirred strand of casing together with a presizing ring to the stuffing horn in a single operation. Others, such as U.S. Pat. Nos. 4,512,059; 4,528,719 and 4,535,508 have sought to improve on the Beckman concept by means of expandable sizing rings of the type which can be readily attached to stuffing machines by also prepackaging in the deshirred ends of strands. After engaging the strand with the stuffing horn, the sizing ring can be expanded from an unexpanded state to a casing stretching size by manipulation of the ring on the horn directly through the casing wall. This facilitates both assembly and use of the casing/sizing ring article, since it can be more easily implanted into the casing by the casing manufacturer in a collapsed state, and latter expanded to a casing stretching size by meat processors.

For the most part, presizing rings have relied on attachments to the filling horn. Such devices are frequently based on costly, noneconomic designs, especially in view of the fact that many are disposable or "throw-away" after use articles. For example, the presizing discs of U.S. Pat. No. 4,535,508 comprise a multiplicity of radial arms each having a nonmovable rod passing through a hollow guide. The outer end of each rod has a flattened casing contact which engages with the interior wall of the casing on the horn when inner rod lifters are compressed when mounting to the stuffing horn. U.S. Pat. No. 4,512,059 discloses a device having a plurality of petal-like sizing members arranged around a central hub. Expansion of the petals to size the casing is dependent on each making frictional contact with the casing during stuffing instead of being automatically expanded upon engagement with the stuffing horn like U.S. Pat. No. 4,535,508. U.S. Pat. No. 4,528,719 discloses a two-piece sizing ring comprising a casing engaging first element and a rigid disc second element. In order to expand the first element for engaging with the casing, the second inner disc must be compressed to engage with the first element. Although such sizing devices are useful, production costs would detract from generally wide acceptance.

Accordingly, there is need for a more economic means for presizing casing during the filling process which can be used repeatedly, and which is an integral component of the filling machine, while allowing installation of unfilled casing without interference.

SUMMARY OF THE INVENTION

It is a principal object of the invention to provide a filling horn for a food stuffing apparatus comprising an inner tubular body for carrying foodstuff to a food casing and an outer tubular body in which at least a portion or the inner tubular body is coaxially mounted, at least one of the tubular bodies being movable relative to the other, and a spring member coiled around at least one of the tubular bodies and adapted to expand radially upon movement of one of the tubular bodies. With rotational movement of a tubular body counter to the direction of coiling of the spring radial expansion of the spring and engagement of the inner sidewall of the unrilled casing occurs. During the filling cycle casing withdrawn from the filling horn over the expanded spring member is sized to the desired predetermined diameter.

It is yet a further object of the invention to provide a filling horn for a food stuffing apparatus having a horn outlet portion as an extension of said inner tubular body longitudinally spaced from the outer tubular body so as to form a gap or recess between the aft end of the horn outlet portion and the fore end of the outer tubular body. A spring member circumferentially wound around the inner tubular body with one end anchored to the outer tubular body and the other end affixed to the horn outlet remains in the horn recess when in a relax=d position allowing easy reloading of the filling horn with a shirred casing. The spring, however, can be radially expanded to the desired presizing diameter by rotational movement of either the inner or outer tubular body.

It is yet a further object of the present invention to provide an improved filling apparatus for stuffing food casing in combination with the above described filing horn having an expandable presizing device built-in, thereby eliminating the need for attaching separate presizing rings to the filling horn.

It is still a further principal object of the present invention to provide improved methods for filling food casings by the steps of loading a casing onto a filling horn comprising an inner tubular body, an outer tubular body at least in-part coaxially mounted on the inner tubular body wherein at least one of the tubular bodies is movable relative to the other, and a spirally wound spring circumferentially mounted over said filling horn with one end affixed to said inner tubular body and a second end affixed to said outer tubular body, and moving the rotatable tubular body so as to expand the spring sufficiently to engage the casing prior to filling.

DESCRIPTION OF THE DRAWINGS

For a further understanding of the invention as well as its characterizing features, reference should now be made to the following detailed description thereof taken in conjunction with the accompanying drawings, wherein:

FIG. 1 is a side elevational view of the dual tube filling horn with the presizing spring in a relaxed state;

FIG. 2 is also a side elevational view of the filling horn of FIG. 1 with presizing spring in an expanded state;

FIG. 3 is an end view of the filling horn taken along line 3—3 of FIG. 2.

DETAILED DESCRIPTION OF THE INVENTION

Figure 4:
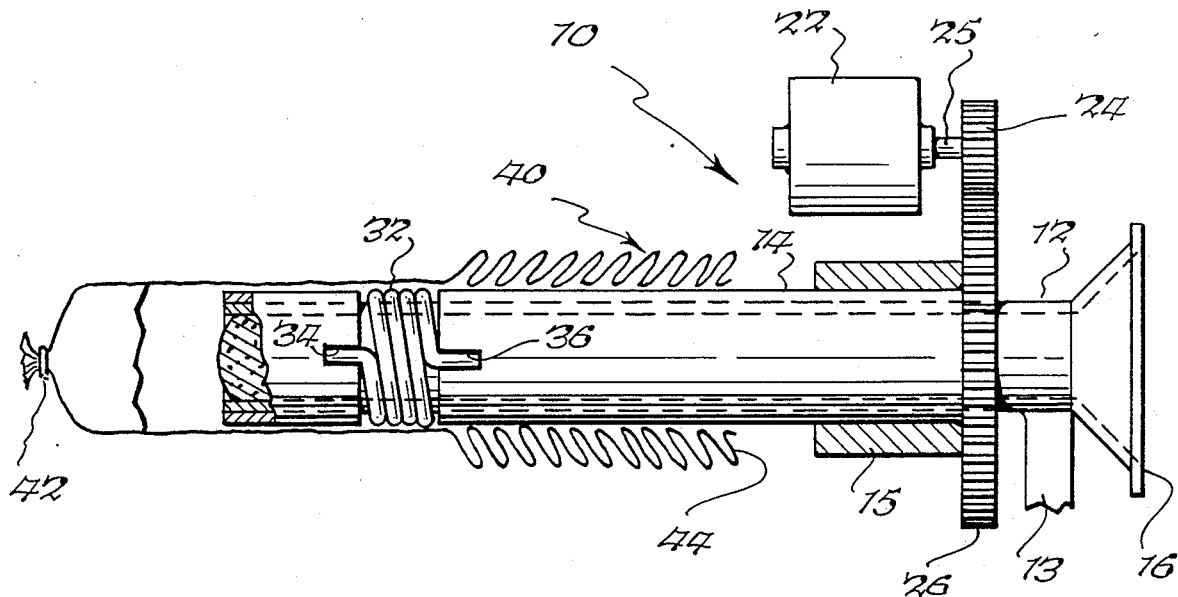
FIG. 4 illustrates the filling horn of FIG. 1 with the presizing spring in a relaxed state for loading the horn with a new shirred casing.

Turning first to FIG. 1, there is shown a filling tube or horn 10 for engaging with the food pump of a stuffing machine of conventional design. Horn 10 comprises dual tubes, an inner horn 12 having part 13 to prevent rotation and an outer horn 14 with bearing 15. The outer horn circumferentially surrounds the inner horn in a coaxial relationship. Foodstuff, under pressure, enters the inner horn at the inlet end 16, travels through the horn shaft and is discharged at the horn outlet 18 into casing mounted on the filling horn, as best illustrated by FIGS. 3 and 4. The outer horn 14 as shown by the direction of arrow 20 (FIG. 2) is rotatable, whereas the inner horn remains stationary. The outer horn may be rotatably driven by motor means 22 which can be powered by air or other equivalent means through a series of gears 24 and 26. Gear 24 is affixed to motor drive shaft 25, and gear 26 circumferentially engages with outer horn 14. Other equivalent transmission means may be employed in addition to gears, such as belts and pulleys. While the invention has been illustrated in conjunction with a rotatable outer horn and a stationary inner horn it is to be understood that the invention also contemplates embodiments which employ a stationary outer horn and a movable inner horn.

The fore end of the filling horn includes a horn outlet portion 28 which is a continuation of inner horn 12. Because horn outlet portion 28 is part of the inner horn it too is stationary. Preferably, the outside diameter of horn outlet portion 28 is substantially equal to that or outer horn 14.

A gap 30 in the shaft of the horn between the fore end of outer horn 14 and the aft end of enlarged horn outlet portion 28 provides sufficient space, width and depth, for a presizing element 32. Coiled element 32 is preferably a spring which in a relaxed state fits circumferentially around and adjoins inner horn 12. The outside diameter of the spring corresponds substantially with the diameter of the outer horn and horn outlet portion 28 when the spring is in a relaxed state. This enables a new strand of shirred casing to be easily loaded onto the horn prior to filling. Generally, the spring is spiral shaped, but other representative examples may include helical spindle type springs, center volute springs, to name but a few. One terminal end of the spring is locked in groove 34 of stationary horn outlet portion 28. The second end of the spring is mounted in groove 36 of rotatable outer horn 14.

FIGS. 2 and 3 illustrate expansion of presizing element 32 through actuation of motor means 22. By counterclockwise rotation of outer horn 14 element 32 opens uniformly increasing the OD of the coils. Expansion of the sizing spring can be regulated by controlling the degree of rotation of outer horn 14 through motor means 22. For example, the dual tube stuffing horn of the invention having the built-in sizing element 32 illustrated in FIG. 4 is in a relaxed state prior to actuation of motor 22. A shirred casing 40 having an enclosure clip 42 can be easily loaded onto the stuffing horn since sizing element 32 is not expanded. The pleated portion 44 of the shirred, unfilled casing is upstream from the presizing element which may be expanded prior to the time the meat pump is actuated.

Figure 5:
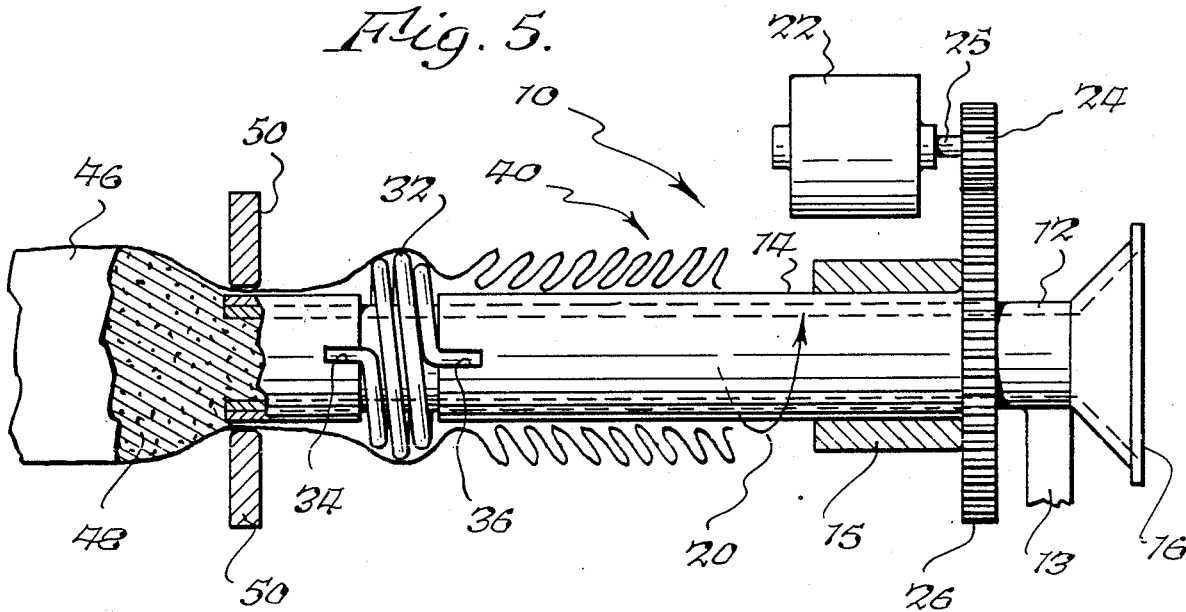
FIG. 5 illustrates the filling horn of FIG. 3 during the actual filling cycle with casing being drawn over the expanded presizing spring.

FIG. 5 depicts presizing coils of element 32 in an expanded condition during the filling cycle in which product 46 is stuffed with meat emulsion 48. Before filling is initiated motor 22 is actuated to rotate outer horn 14 sufficiently to expand spring element diametrically against the interior wall of the deshirred casing being withdrawn from the horn. The degree of expansion of the coils of the presizing spring and diametrical stretching of the casing should generally conform with casing manufacturer recommended stuffed diameter for the particular casing being filled. FIG. 5 also shows a casing brake 50 of conventional design which assists in regulating the rate of withdrawal of unfilled casing from the horn during stuffing for preparing packed products with greater dimensional uniformity. Brake 50 may be of any conventional design.

Although the invention has been described in considerable detail with respect to the preferred embodiments thereof, it will be apparent that the invention is capable of numerous modifications and variations to those skilled in the art without departing from the spirit and scope of the invention as defined in the appended claims.

What is claimed is:

1. A filling horn for a food stuffing apparatus, which comprises an inner tubular body, an outer tubular body at least in-part coaxially mounted on said inner tubular buoy, at least one of said tubular bodies being movable relative to the other, and a spring member circumferentially coiled around at least one of said tubular bodies and adapted to expand radially upon movement of one of said tubular bodies.

2. The filling horn of claim 1 wherein said spring is a spiral type having dual terminal ends, one for engaging with said inner tubular body and the other for engaging with said outer tubular body.

3. The filling horn of claim 2 wherein said outer tubular body is rotatable relative to said inner tubular body.

4. The filling horn of claim 1 wherein said inner tubular body is rotatable relative to said outer tubular body.

5. The filling horn of claim 3 including a horn outlet portion engaged to said inner tubular body, said horn outlet being longitudinally spaced from said outer tubular body forming a gap therebetween, wherein said spiral spring is positioned circumferentially around said inner tubular body in said gap.

6. The filling horn of claim 4 including a horn outlet portion engaged with said inner tubular body, said horn outlet portion being longitudinally spaced from said outer tubular body forming a gap therebetween, wherein said spiral spring is positioned circumferentially around said inner tubular body in said gap.

7. The filling horn of claim 3 wherein said spring member is adapted to expand sufficiently to engage the inside wall of said casing for sizing prior to filling.

8. The filling horn of claim 4 wherein said spring member is adapted to expand sufficiently to engage the inside wall of said casing for sizing prior to filling.

9. The filling horn of claim 1 in combination with a food filling apparatus.

10. The filling horn of claim 3 in combination with a food filling apparatus.

11. The filling horn of claim 4 in combination with a food filling apparatus.

12. A method of filling a food casing which comprises the steps of loading a casing onto a filling horn, said horn comprising an inner tubular body, an outer tubular body at least in-part coaxially mounted on said inner tubular body, at least one of said tubular bodies being rotatable relative to the other, and a spring member circumferentially coiled around at least one of said tubular bodies and adapted to expand radially upon movement of one of said tubular bodies, and rotating the rotatable tubular body so as to expand the spring sufficiently to engage the casing interior.

13. The method of claim 12 wherein the casing is a shirred strand of fibrous reinforced cellulose.

* * * * *

UNITED STATES PATENT AND TRADEMARK OFFICE
CERTIFICATE OF CORRECTION

PATENT NO. : 4,958,411

DATED : September 25, 1990

INVENTOR(S) : Thomas R. Stanley

It is certified that error appears in the above-identified patent and that said Letters Patent is hereby corrected as shown below:

Claim 1, Column 4, line 66 "buoy" should read -- body --

Signed and Sealed this

Twenty-fourth Day of December, 1991

*Attest:*

HARRY F. MANBECK, JR.

*Attesting Officer*    *Commissioner of Patents and Trademarks*